(12) United States Patent
Mujibiya

(10) Patent No.: US 10,222,862 B2
(45) Date of Patent: Mar. 5, 2019

(54) METHOD TO SENSE FORCE EXERTION ON HANDHELD DEVICE FOR BEHAVIOR SETTING AND INPUT FOR QUICK RESPONSE

(71) Applicant: LENOVO (SINGAPORE) PTE. LTD., Singapore (SG)

(72) Inventor: Adiyan Mujibiya, Tokyo (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/614,332

(22) Filed: Jun. 5, 2017

(65) Prior Publication Data

US 2018/0348867 A1 Dec. 6, 2018

(51) Int. Cl.
*G06F 3/01* (2006.01)
*G06F 3/041* (2006.01)
*G06N 99/00* (2010.01)
*H04M 1/725* (2006.01)

(52) U.S. Cl.
CPC ............ *G06F 3/016* (2013.01); *G06F 3/0414* (2013.01); *G06N 99/005* (2013.01); *H04M 1/72569* (2013.01); *H04M 1/72583* (2013.01); *G06F 2203/014* (2013.01)

(58) Field of Classification Search
CPC ...... G06F 3/016; G06F 3/0414; G06N 99/005
See application file for complete search history.

(56) References Cited

U.S. PATENT DOCUMENTS

2012/0088553 A1* 4/2012 Nunes .................. G06F 1/1626
455/566
2015/0251089 A1* 9/2015 Komori ................ A63F 13/285
463/35
2016/0313205 A1* 10/2016 Gowreesunker ........ G01L 25/00
2018/0039368 A1* 2/2018 Choi ..................... G06F 3/0414
2018/0107174 A1* 4/2018 Takahashi ................ G05B 9/02

* cited by examiner

*Primary Examiner* — Laurence J Lee
(74) *Attorney, Agent, or Firm* — Shimokaji IP

(57) ABSTRACT

Methods and systems are provided for sensing force exertion on mobile handheld devices for behavior setting and input for quick response. A method is provided comprising: applying a waveform drive to a haptic actuator to initiate a vibration of the handheld device; receiving signal data from one or more sensors during the vibration; determining a force exertion state of the handheld device based on an analysis of the signal data; and performing an action on the handheld device based on the force exertion state. The action may modify an operating mode for behavior setting of the handheld device, or enable the user to provide a quick response to carry out a desired action.

19 Claims, 7 Drawing Sheets

Force Exertion State 181b: Device gripped in hand

Force Exertion State 181c: Hand light squeezing the device

Force Exertion State 181d: Transition from 181b to 181c to 181b

FIG. 2A

| Force Exertion State 281a : Resting on Surface |
|---|

| Operating Mode 290a |
|---|
| Ringer Volume 292a : Loud |
| Power Profile 294a : Hibernate |
| Vibration Setting 296a : Off |
| Display Setting 298a : Bright |

FIG. 2B

| Force Exertion State 281b : Gripped in Hand |
|---|

| Operating Mode 290b |
|---|
| Ringer Volume 292b : Quiet |
| Power Profile 294b : Performance |
| Vibration Setting 296b : On |
| Display Setting 298b : Normal |

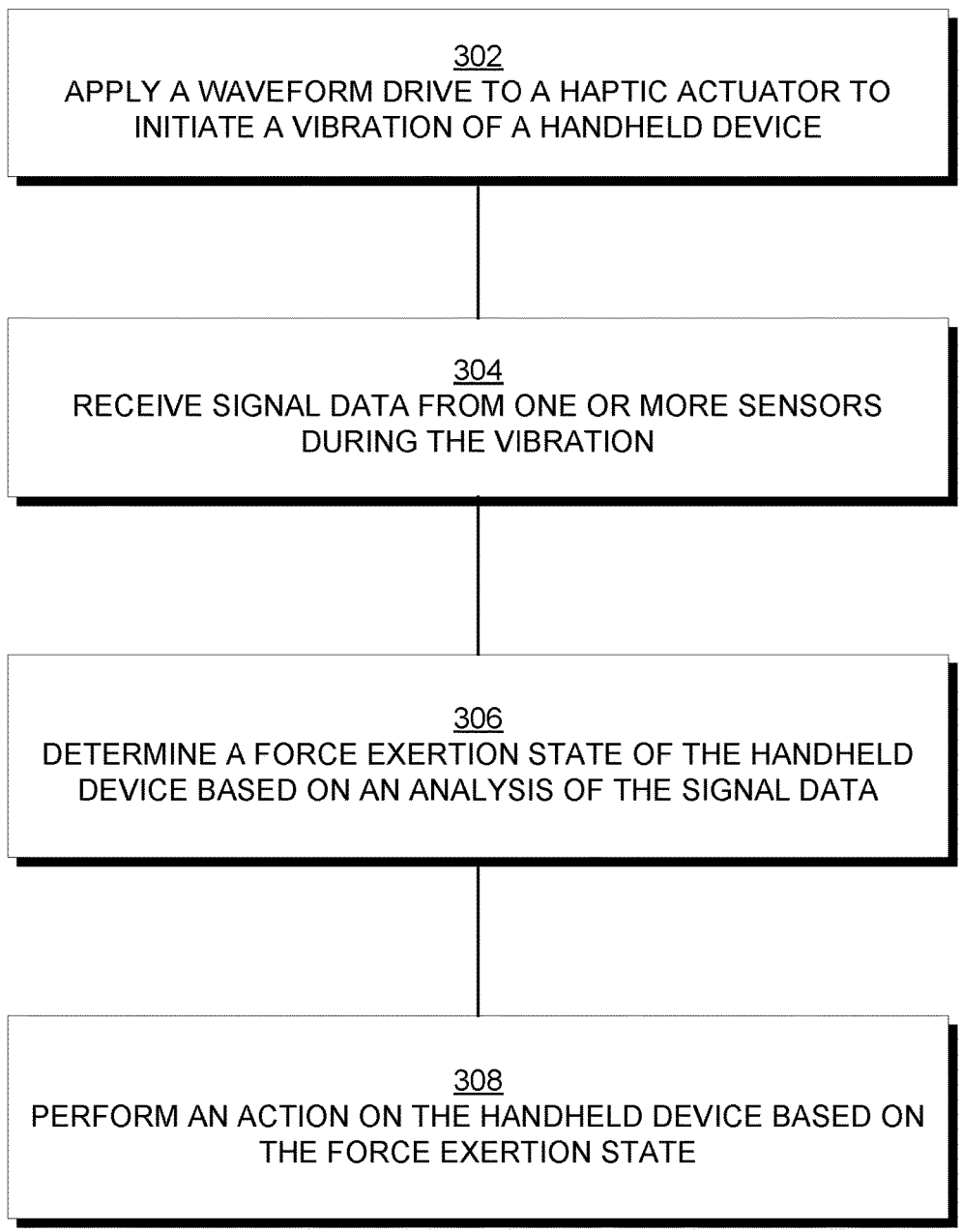

METHOD TO SENSE FORCE EXERTION ON HANDHELD DEVICE FOR BEHAVIOR SETTING AND INPUT FOR QUICK RESPONSE

BACKGROUND OF THE INVENTION

The present invention relates generally to force detection on handheld mobile devices. More particularly, the invention relates to systems and methods for sensing force exertion on mobile devices for behavior setting and input for quick response.

Mobile devices such as smartphones have become an essential part of daily life. As the trend towards larger screens continues, device real estate is becoming an increasingly precious commodity. Often, physical buttons and other dedicated input interfaces are being sacrificed to accommodate a larger screen and/or a thinner bezel, or even no bezel.

To make up for the lost functionality of missing dedicated inputs, mobile devices have added force sensing technology, allowing the user to interface with the device by applying force to the screen, bezel, or another portion of the device. However, known implementations require the installation of expensive force sensors which only detect force for a specific portion of the device. In turn, this drives up the cost of the device and makes it difficult for the user to provide a quick input response. For example, an incoming phone call may demand an immediate response from the user, which may be difficult to provide if the user must identify and apply force to only a specific portion of the device.

As can be seen, there is a need for a system and method to improve detection of force exertion on mobile devices.

SUMMARY OF THE INVENTION

In one aspect of the present invention, a handheld device is provided, comprising: a haptic actuator; one or more sensors including a gyroscope and an accelerometer; and a processor configured to: apply a waveform drive to the haptic actuator to initiate a vibration of the handheld device; receive signal data from the one or more sensors during the vibration; determine a force exertion state of the handheld device based on an analysis of the signal data; and perform an action on the handheld device based on the force exertion state.

In another aspect of the present invention, a method for providing force exertion detection for a handheld device is provided, the method comprising: applying a waveform drive to a haptic actuator to initiate a vibration of the handheld device; receiving signal data from one or more sensors during the vibration; determining a force exertion state of the handheld device based on an analysis of the signal data; and performing an action on the handheld device based on the force exertion state; wherein the method is performed by one or more processors.

In still another aspect of the present invention, a non-transitory computer readable media containing computer readable instructions is provided. When executed by one or more processors, the computer readable instructions cause: applying a waveform drive to a haptic actuator to initiate a vibration of a handheld device; receiving signal data from one or more sensors during the vibration; determining a force exertion state of the handheld device based on an analysis of the signal data, wherein the analysis includes filtering the signal data at a predetermined cutoff to produce a high pass motion signal, wherein the predetermined cutoff is based on the haptic actuator; and performing an action on the handheld device based on the force exertion state.

These and other features, aspects and advantages of the present invention will become better understood with reference to the following drawings, description and claims.

BRIEF DESCRIPTION OF THE DRAWINGS

FIG. 2A and FIG. 2B illustrate example operating modes of a handheld device set according to a detected force exertion state, in accordance with an exemplary embodiment of the invention;

FIG. 3 is a flow chart of a method for providing force exertion sensing for behavior setting and input for quick response, in accordance with an exemplary embodiment of the invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention relates generally to methods and apparatus for force detection on handheld mobile devices. More particularly, the invention relates to systems and methods for sensing force exertion on mobile devices for behavior setting and input for quick response.

Figure 1A:
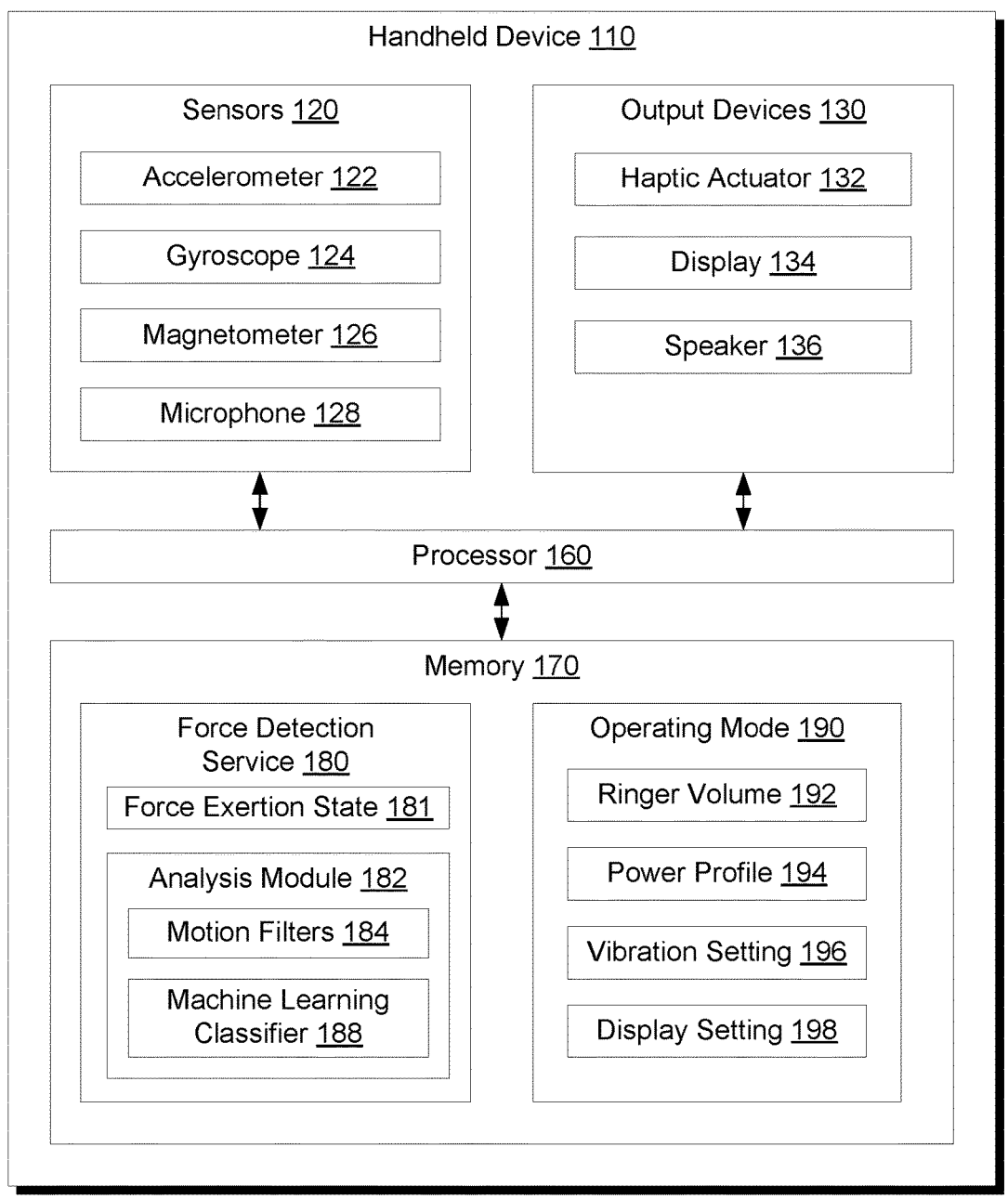
FIG. 1A is schematic block diagram of a handheld device that provides force exertion sensing for behavior setting and input for quick response, in accordance with an exemplary embodiment of the invention.

Referring now to FIG. 1A, a schematic block diagram of a handheld device that provides force exertion sensing for behavior setting and input for quick response is shown. FIG. 1A includes handheld device 110. Handheld device 110 may correspond to a mobile handheld device such as a smartphone, tablet, or other device. Handheld device 110 may include sensors 120, output devices 130, processor 160, and memory 170. Processor 160 may comprise one or more general purpose or customized processors, such as but not limited to an ASIC, FPGA, SoC, or other IC. Sensors 120 may include accelerometer 112, gyroscope 124, magnetometer 126, and microphone 128. Output devices 130 may include haptic actuator 132, display 134, and speaker 136. Haptic actuator 132 may comprise any type of AC or DC haptic motor or actuator. Memory 170 may include force detection service 180 and operating mode 190. Force detection service 180 may include force exertion state 182 and analysis module 182. Analysis module 182 may include motion filters 184 and machine learning classifier 188. Operating mode 190 may include ringer volume 192, power profile 194, vibration setting 196, and display setting 198.

As shown in FIG. 1A, handheld device 110 may execute force detection service 180 using processor 160. Force detection service 180 may update force exertion state 181 in response to an opportunistic event and/or on a periodic basis. When force detection service 180 determines that an update to force exertion state 181 is necessary, it may first send a waveform to haptic actuator 132 to cause a vibration of handheld device 110. During the vibration, sensors 120 may be engaged to receive signal data, which can then be processed through analysis module 182 to determine and update force exertion state 181. Based on force exertion state 181, one or more actions may be carried out by processor 160, which may include updating operating mode 190. In this manner, handheld device 110 is provided with force exertion sensing that can be used for behavior setting or to enable a quick response from a user.

Advantageously, handheld device 110 does not need to be provided with dedicated force sensors to detect force exertion state 181. Instead, force detection service 180 takes advantage of common parts that are widely available in portable handheld devices, such as accelerometer 122, gyroscope 124, magnetometer 126, microphone 128, and haptic actuator 132. As a result, force detection can be readily provided to existing mobile handheld devices while reducing the bill of materials (BOM) for new devices.

Further, handheld device 110 also advantageously provides force detection for the entire handheld device 110, rather than for only a specific portion where a force sensor is installed, such as only on the edge of the bezel or only on the display. When force is applied anywhere to handheld device 110 during a vibration initiated by haptic actuator 132, then the force can be detected as a recognizable pattern within signal data provided by sensors 120. Thus, when compared to conventional force detection sensors, the present invention enables a quicker input response as the user does not need to precisely apply force to a specific portion of the handheld device. This may be especially important for events demanding immediate attention, such as an incoming call or an alarm.

Figure 1B:
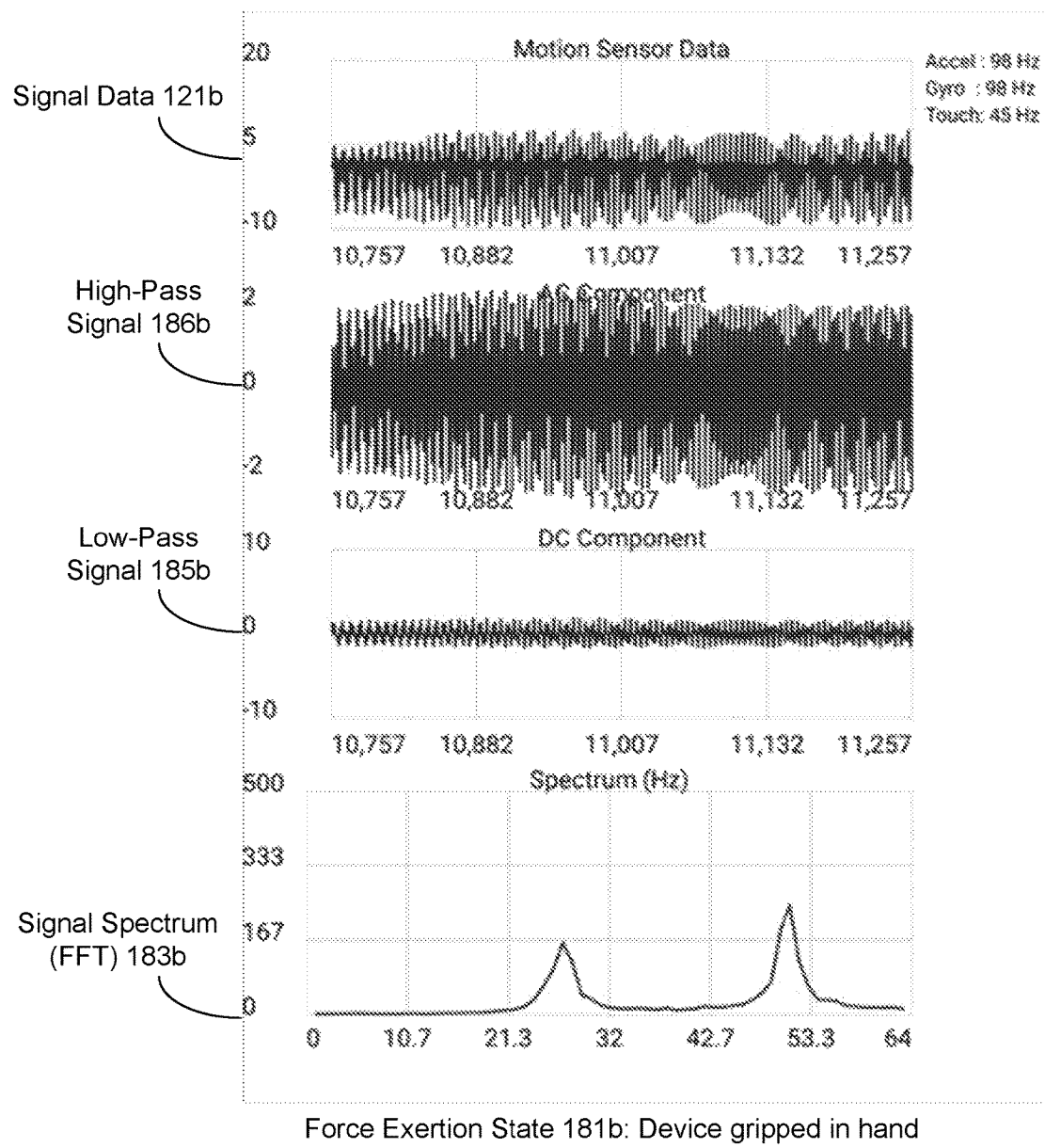
FIG. 1B, FIG. 1C and FIG. 1D are exemplary signal graphs that are captured and filtered during a vibration of a handheld device, in accordance with an exemplary embodiment of the invention.
Figure 1C:
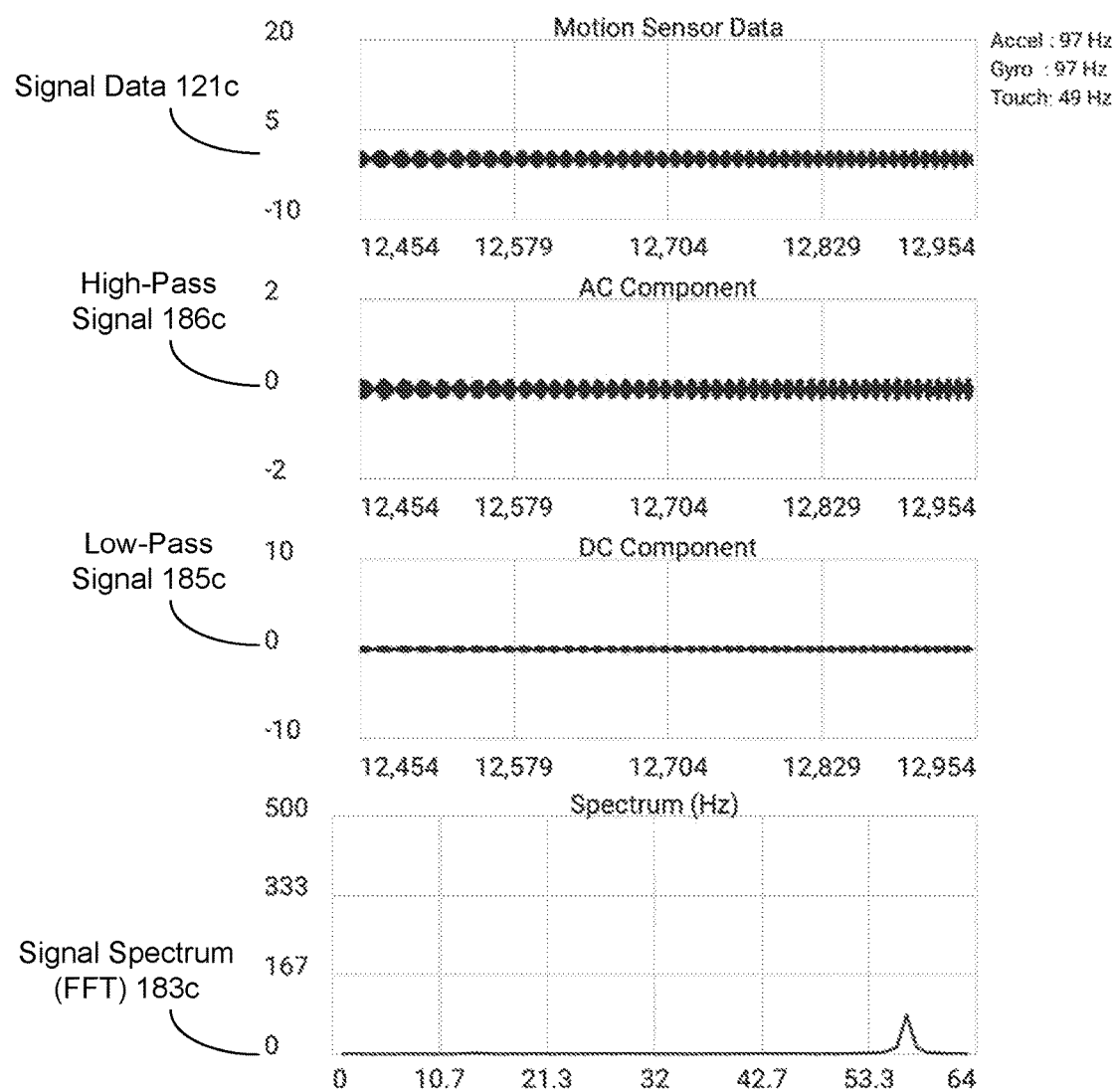
Figure 1D:
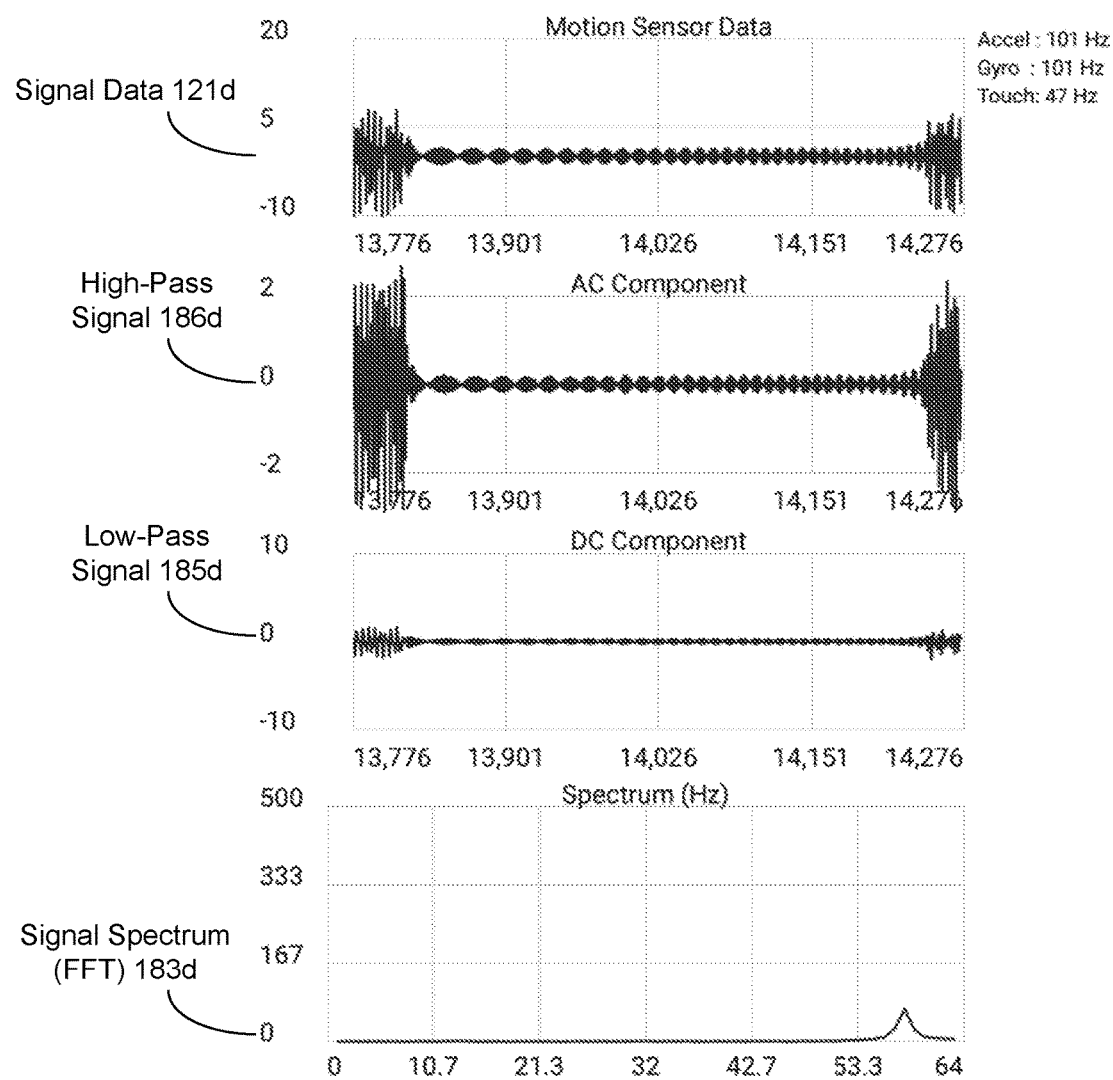

To provide examples of signal data used for analysis, referring to FIG. 1B, FIG. 1C and FIG. 1D, exemplary signal graphs that are captured and filtered during a vibration of a handheld device are shown. Referring to FIG. 1A, FIG. 1B may correspond to a graph of motion over time while handheld device 110 is gripped in hand, and includes signal data 121b, signal spectrum (FFT) 183b, low-pass signal 185b, and high-pass signal 186b.FIG. 1C may correspond to a graph of motion over time while handheld device 110 is gripped and lightly squeezed in hand, and includes signal data 121c, signal spectrum (FFT) 183c, low-pass signal 185c, and high-pass signal 186c.FIG. 1D may correspond to a graph of motion over time while handheld device 110 is first gripped in hand, then lightly squeezed, then released to go back to being gripped in hand, and includes signal data 121d, signal spectrum (FFT) 183d, low-pass signal 185d, and high-pass signal 186d.

Signal data 121b may correspond to motion data captured by sensors 120. Thus, signal data 121b may correspond to motion data captured from accelerometer 122, gyroscope 124, and magnetometer 126. In the example shown in FIG. 1B, signal data 121b may be captured at 200 Hz (100 Hz Nyquist rate), however any suitable sampling rate may be utilized based on analysis requirements and capabilities of sensors 120 and haptic actuator 132. Signal analysis may proceed for each X, Y, and Z axis separately or in combination. To assist in analysis, the raw signal data 121b may be processed by one or more elements of analysis module 182. For example, a low pass filter of motion filters 184 may be applied to create a low-pass signal 185b that attenuates frequencies higher than a cutoff frequency, such as 50 Hz. Similarly, a high pass filter of motion filters 184 may be applied to create a high-pass signal 186b that attenuates frequencies lower than a cutoff frequency, such as 100 Hz. The cutoff frequencies may be based on the specific properties of the motor of actuator chosen for haptic actuator 132.

Once these signals are acquired, signal data 121b, low-pass signal 185b, and high-pass signal 186b may be parsed through one or more analysis algorithms to determine force exertion state 181. For example, these analysis algorithms may include determining a variance, median, power, magnitude, and a fast Fourier transform (FFT) of the original or filtered signals, such as signal spectrum (FFT) 183b.

Besides motion data, other data captured by sensors 120 may be utilized to help determine force exertion state 181. For example, microphone 128 may record audio of the vibration, which may assist in determining whether handheld device 110 is resonating with a surface, for example. Other sensors that are not specifically shown in FIG. 1A may also be utilized. For example, one or more cameras may be utilized to determine the surrounding environment of handheld device 110. If a front facing camera captures a recognizable face, then this information might be utilized to determine whether handheld device 110 is being gripped in hand.

As shown in FIG. 1A, the analysis algorithms may also include a machine learning classifier 188. This machine learning algorithm may be trained on a data set for sensors 120. For example, while haptic actuator 132 is vibrating handheld device 110 with a waveform, a test user may grip handheld device 110 and the resulting sensor data from sensors 120 may be recorded as training data for the classification "gripped in hand". By obtaining training data from a wide variety of test users with varying hand sizes and grip styles, machine learning classifier 188 can be trained to recognize a characteristic "gripped in hand" pattern that is generally applicable to all users.

Since a predetermined waveform may be utilized for haptic actuator 132, a specific sequence or pattern of vibrations with specified lengths and amplitudes can be issued to provide enhanced signal disambiguation compared to a constant or arbitrary waveform. However, an arbitrary waveform may also be utilized. The use of an arbitrary waveform may facilitate simplified implementation using adaptive thresholds to detect motion, rather than using machine learning models. For example, the adaptive thresholds and/or rule trees may be used, based on one or more changing parameters of the signal such as signal power, root-mean-square, and other parameters.

Similar to the process described above for the classification "gripped in hand", by placing handheld device 110 on various surfaces and recording the resulting sensor data from sensors 120, training data for machine learning classifier 188 can be obtained for the classification "resting on surface". This process can be repeated for each required classification. Machine learning classifier 188 can thus be configured to classify force exertion state 181 into one of the trained classifications. As shown in FIG. 1B, force exertion state 181 may be classified as force exertion state 181b, or "gripped in hand", based on the above described signal analysis of signal data 121b.

Moving to FIG. 1C, it can be seen that signal data 121c is filtered by motion filters 184 into low-pass signal 185c and high-pass signal 186c, similar to the process described above with respect to FIG. 1B. During the capture of signal data 121c, the user may lightly squeeze handheld device 110. As shown in FIG. 1C, this results in a visible attenuation of both signal data 121c and high-pass signal 186c. A stronger grip may result in a greater attenuation of high-pass signal 186c, which is the result of the hand squeeze absorbing the vibration energy from haptic actuator 132. Thus, the grip strength may be determined based on the attenuation of the high-pass signal. Similarly, movement of handheld device 110 may be recognizable based on activity patterns in low-pass signal 185c. Major movement may indicate that handheld device 110 is being held in hand, rather than sitting still on a surface. As discussed above, these patterns may be trained into machine learning classifier 188, allowing analysis module 182 to update force exertion state 181 as force exertion state 181c, or "light squeeze", during the time period indicated in FIG. 1C.

The attenuation of the high-pass signal can be more readily appreciated in FIG. 1D. In FIG. 1D, the user may first begin by gripping the device in hand, then lightly squeezing the device, and then releasing the grip so that the device returns to being gripped in hand. As shown in FIG. 1D, a strong attenuation of high-pass signal 186d occurs when the user squeezes the device. Thus, as discussed above, the grip strength can be readily determined based on the attenuation of high-pass signal 186d. Accordingly, force exertion state 181d can be determined as starting in force exertion state 181b (gripped in hand), then transitioning into force exertion state 181c (lightly squeezed), then transitioning back into force exertion state 181b (gripped in hand).

Since the update of force exertion state 181 requires haptic actuator 132 to be engaged, it is not feasible to constantly update force exertion state 181. Accordingly, force detection service 180 may be configured to update force exertion state 181 only periodically and/or opportunistically. For example, every 30 minutes, force detection service 180 may update force exertion state 181. This period of 30 minutes may be configurable to any time period by the manufacturer or user. Besides periodic updates, opportunistic updates may also be employed as a supplement or an alternative to periodic updates. For example, when receiving an incoming request such as an incoming call, handheld device 110 may be configured to engage haptic actuator 132. Force detection service 180 may recognize this as an opportunistic event and perform an update of force exertion state 181 at the same time. In this manner, engagement of haptic actuator 132 can be controlled to preserve battery life and device usability.

With force exertion state 181 now identified, processor 160 may perform one or more actions to control the behavior of handheld device 110. In FIG. 2A and FIG. 2B, example operating modes of a handheld device are set according to a detected force exertion state. FIG. 2A includes force exertion state 281a and operating mode 290a. Operating mode 290a may include ringer volume 292a, power profile 294a, vibration setting 296a, and display setting 298a. FIG. 2B includes force exertion state 281b and operating mode 290b. Operating mode 290b may include ringer volume 292b, power profile 294b, vibration setting 296b, and display setting 298b. With respect to FIG. 2A and FIG. 2B, like numbered elements may correspond to the same elements from FIG. 1A.

As shown in FIG. 2A, when force exertion state 281a indicates "resting on surface", then a corresponding operating mode 290a may be configured as shown. When handheld device 110 is placed on a surface, it can be concluded that the user is not actively using handheld device 110, and thus handheld device 110 may utilize a low power "hibernate" state, as reflected by power profile 294a. When an incoming call or request is received, handheld device 110 may need to provide an enhanced alert to catch the attention of the user. Accordingly, ringer volume 292a may be adjusted to "loud", and display setting 298a may be set to "bright". However, since handheld device 110 is determined to be on a surface rather than on the body of the user, then vibration may be less effective for alerting the user, and thus vibration setting 296a may be toggled to "off".

Conversely, as shown in FIG. 2B, when force exertion state 281b indicates "gripped in hand", then a corresponding operating mode 290b may be configured as shown. When handheld device 110 is gripped in hand, it can be concluded that the user is actively using handheld device 110, and thus handheld device 110 may utilize a high power "performance" state, as reflected by power profile 294b. When an incoming call or request is received, handheld device 110 may easily catch the attention of the user since handheld device 110 is already gripped in the user's hand. Accordingly, ringer volume 292a may be adjusted to "quiet", display setting 298a may be set to "normal", and vibration setting 296b may be toggled to "on". Of course, operating modes 290a-290b are only provided as examples, and the user or manufacturer may adjust the operating modes to meet specific needs and use cases.

Figure 2C:
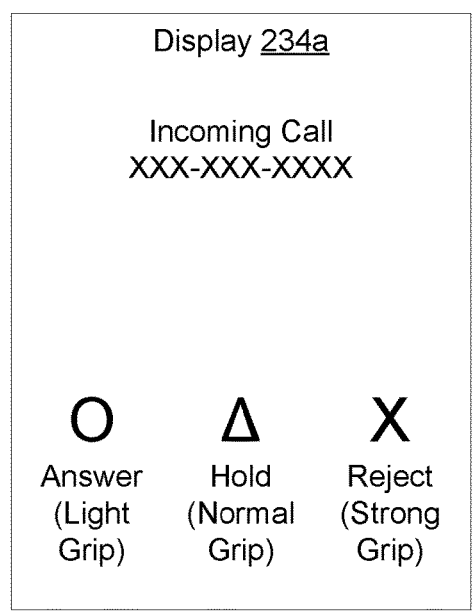
FIG. 2C is an exemplary depiction of a user interface of a handheld device that provides force exertion sensing for a quick response input, in accordance with an exemplary embodiment of the invention.

Besides controlling the behavior of handheld device 110, force exertion state 181 may also be utilized to receive a quick response from the user. FIG. 2C is an exemplary depiction of a user interface of a handheld device that provides force exertion sensing for a quick response input. FIG. 2C includes display 234a, force exertion state 281c, force exertion state 281d, and force exertion state 281e. With respect to FIG. 2C, like numbered elements may correspond to the same elements from FIG. 1.

Referring to FIG. 1A, when handheld device 110 receives an incoming call, display 134 may alert the user of the incoming call and provide the user with various options for responding to the incoming call. In FIG. 2C, display 234a shows one example user interface, wherein the user is provided with the options "Answer", "Hold", and "Reject". Besides touching the relevant selection on display 234a as with a conventional device, the user may also elect to simply squeeze handheld device 110 with a level of force corresponding to the desired action. This may be especially beneficial for one-handed operation, when it may be difficult to precisely touch the correct area of display 234a.

Thus, if the user wants to answer the call, the user may lightly squeeze handheld device 110, resulting in force exertion state 281c. If the user wants to place the call on hold, the user may normally squeeze handheld device 110, resulting in force exertion state 281d. If the user wants to reject the call, the user may strongly squeeze handheld device 110, resulting in force exertion state 281e. Based on the force exertion state, processor 160 may carry out relevant action of answering, placing on hold, or rejecting the incoming call. Besides responding to incoming calls, the force detection may be utilized to silence an alarm, respond to an alert, or perform any other action, which may be configurable by the user. For example, force detection may also be utilized for user interface navigation such as returning to a home screen or navigating backwards.

Referring now to FIG. 3, a flow chart illustrates a method 300 for providing force exertion sensing on handheld devices for behavior setting and input for quick response. In block 302, referring to FIG. 1A, processor 160 applies a waveform drive to haptic actuator 132 to initiate a vibration of handheld device 110. As discussed above, the waveform drive may be a predetermined waveform drive to provide vibrations of specific length and amplitude for enhanced signal disambiguation. In other embodiments, the waveform drive may be an arbitrary waveform. Further, block 302 may be initiated as a periodic update of force detection service 180, or in response to an opportunistic event such as an incoming call with a vibration alert.

In block 304, referring to FIG. 1A, processor 160 receives signal data from sensors 120 during the vibration of block 302. Besides motion data from accelerometer 122, gyroscope 124, and magnetometer 126, other data may be captured such as audio data from microphone 128 and visual data from cameras (not shown).

In block 306, referring to FIG. 1A, processor 160 determines force exertion state 181 of handheld device 110 based on an analysis of the signal data from block 304. As discussed above, analysis module 182 may perform low-pass and high-pass filtering via motion filters 184 as well as classification via machine learning classifier 188.

In block 308, referring to FIG. 1A, processor 160 performs an action on handheld device 110 based on force exertion state 181 updated in block 306. This action may include setting operation mode 190 to adjust the behavior of handheld device 110, as discussed above in conjunction with FIG. 2A and FIG. 2B, or performing an action in response to a user input, as discussed above in conjunction with FIG. 2C.

It should be understood that method 300 may be implemented as computer readable instructions that are provided on non-transitory computer readable media, such as a hard disk drive, flash memory, an optical disc, or other media. When executed by one or more processors, the instructions may cause method 300 to be carried out.

It should be understood, of course, that the foregoing relates to exemplary embodiments of the invention and that modifications may be made without departing from the spirit and scope of the invention as set forth in the following claims.

I claim:

1. A handheld device comprising:
    a haptic actuator;
    one or more sensors including a gyroscope and an accelerometer; and
    a processor configured to:
        apply a waveform drive to the haptic actuator to initiate a vibration of the handheld device;
        receive signal data from the one or more sensors during the vibration;
        determine a force exertion state of the handheld device based on an analysis of the signal data;
        wherein determining the force exertion state includes:
            filtering the signal data to produce at least one of a high pass motion signal and a low pass motion signal;
            identifying at least one of an attenuation during the high pass motion signal and a pattern during the low pass motion signal; and
        perform an action on the handheld device based on the force exertion state.

2. The handheld device of claim 1, wherein the determining comprises:
    setting the force exertion state as squeezing the handheld device with a grip strength based on the attenuation.

3. The handheld device of claim 1, wherein the determining comprises:
    setting the force exertion state as a movement of the handheld device based on the pattern.

4. The handheld device of claim 1, wherein the determining comprises:
    utilizing a machine learning algorithm to determine the force exertion state based on training data for the one or more sensors.

5. The handheld device of claim 1, wherein the force exertion event corresponds to the handheld device resting on a surface.

6. The handheld device of claim 1, wherein the action includes at least one of:
    selecting a power profile;
    adjusting a ringer volume;
    toggling a vibration setting; and
    adjusting a display setting.

7. The handheld device of claim 1, wherein when the handheld device receives an incoming request, the action is selected from:
    answering the incoming request;
    holding the incoming request; and
    rejecting the incoming request.

8. A method for providing force exertion detection for a handheld device, the method comprising:
    applying a waveform drive to a haptic actuator to initiate a vibration of the handheld device;
    receiving signal data from one or more sensors during the vibration;
    determining a force exertion state of the handheld device based on an analysis of the signal data;
    wherein determining the force exertion state includes:
        filtering the signal data to produce at least one of a high pass motion signal and a low pass motion signal;
        identifying at least one of an attenuation during the high pass motion signal and a pattern during the low pass motion signal; and
    performing an action on the handheld device based on the force exertion state, wherein the action comprises one of: selecting a power profile, adjusting a ringer volume, toggling a vibration setting, adjusting a display setting, and responding to an alert;
    wherein the method is performed by one or more processors.

9. The method of claim 8, wherein the one or more sensors include at least one of a gyroscope, an accelerometer, a magnetometer, and a microphone.

10. The method of claim 8, wherein the determining comprises:
    setting the force exertion state as squeezing the handheld device with a grip strength based on the attenuation.

11. The method of claim 8, wherein the determining comprises:
    setting the force exertion state as a movement of the handheld device based on the pattern.

12. The method of claim 8, wherein the determining comprises:
    utilizing a machine learning algorithm to determine the force exertion state based on training data for the one or more sensors.

13. The method of claim 8, wherein the alert is an incoming phone call, and wherein the action comprises one of:
    answering the incoming phone call;
    holding the incoming phone call; and
    rejecting the incoming phone call.

14. A non-transitory computer readable media containing computer readable instructions that, when executed by one or more processors, causes:
- applying a waveform drive to a haptic actuator to initiate a vibration of a handheld device;
- receiving signal data from one or more sensors during the vibration;
- determining a force exertion state of the handheld device based on an analysis of the signal data, wherein the analysis includes filtering the signal data at a predetermined cutoff to produce a high pass motion signal, identifying an attenuation during the high pass motion signal, and setting the force exertion state as squeezing the handheld device with a grip strength based on the attenuation, wherein the predetermined cutoff is based on the haptic actuator; and
- performing an action on the handheld device based on the force exertion state.

15. The non-transitory computer readable media of claim 14, wherein the one or more sensors include at least one of a gyroscope, an accelerometer, a magnetometer, and a microphone.

16. The non-transitory computer readable media of claim 14, wherein the determining comprises:
- filtering the signal data to produce a low pass motion signal;
- identifying a pattern during the low pass motion signal; and
- setting the force exertion state as a movement of the handheld device based on the pattern.

17. The non-transitory computer readable media of claim 14, wherein the determining comprises:
- utilizing a machine learning algorithm to determine the force exertion state based on training data for the one or more sensors.

18. The non-transitory computer readable media of claim 14, wherein the action comprises at least one of:
- selecting a power profile;
- adjusting a ringer volume;
- toggling a vibration setting; and
- adjusting a display setting.

19. The non-transitory computer readable media of claim 14, wherein when the handheld device receives an incoming request, the action is selected from:
- answering the incoming request;
- holding the incoming request; and
- rejecting the incoming request.

* * * * *